(12) United States Patent
Wise et al.

(10) Patent No.: US 12,224,948 B2
(45) Date of Patent: Feb. 11, 2025

(54) METHOD FOR ENHANCING THE COMMUNICATIONS EFFICIENCY OF A MOBILE PLATFORM

(71) Applicant: WGS Systems, LLC, Frederick, MD (US)

(72) Inventors: Robert Wise, Eldersburg, MD (US); Kirk Griffin, Columbia, MD (US); Larry Belella, Waynesboro, PA (US); Robert Luke, Keymar, MD (US); Martin Dillon, Ellicott City, MD (US); Jesse Bierer, Frederick, MD (US); Jason Smith, Greencastle, PA (US)

(73) Assignee: WGS Systems, LLC, Frederick, MD (US)

( * ) Notice: Subject to any disclaimer, the term of this patent is extended or adjusted under 35 U.S.C. 154(b) by 493 days.

(21) Appl. No.: 17/851,392

(22) Filed: Jun. 28, 2022

(65) Prior Publication Data
US 2024/0323135 A1 Sep. 26, 2024

(51) Int. Cl.
*H04L 47/43* (2022.01)
*H04W 28/02* (2009.01)

(52) U.S. Cl.
CPC ......... *H04L 47/43* (2022.05); *H04W 28/0289* (2013.01)

(58) Field of Classification Search
CPC ........ H04L 47/32; H04L 47/43; H04W 28/06; H04W 28/0289; H04W 28/0278
See application file for complete search history.

(56) References Cited

U.S. PATENT DOCUMENTS

| | | | |
|---|---|---|---|
| 8,644,281 B2 | 2/2014 | Seok et al. |
| 8,867,448 B2 | 10/2014 | Ji et al. |
| 9,961,600 B2 | 5/2018 | Gopal et al. |
| 10,039,114 B2 | 7/2018 | Tan |
| 10,149,276 B2 | 12/2018 | Akula et al. |
| 10,454,640 B2 | 10/2019 | Wang et al. |
| 10,516,454 B2 | 12/2019 | Hu et al. |
| 10,771,953 B2 | 9/2020 | Bienas et al. |
| 11,057,079 B2 | 7/2021 | Calzolari et al. |
| 2018/0077617 A1 | 3/2018 | Xue et al. |

*Primary Examiner* — Syed Ali
*Assistant Examiner* — Najeeb Ansari
(74) *Attorney, Agent, or Firm* — Larry J. Guffey; Oliver & Grimsley, LLC

(57) ABSTRACT

A method for increasing the effectiveness of a mobile platform's data communications link includes the steps of: (a) attaching high gain antennas to the platform, (b) providing it with the following: a processor with memory and software, an antenna switching mechanism, an inertial measurement unit, and a GNSS receiver, and wherein the software is configured to: (c) assist in performing antenna switching so that the antennas yield a "pseudo isotropic" energy radiation pattern, (d) classify and prioritize data for transmission based on the nature and criticality of the data, (e) queue the data, based on its classification, during a communication link loss for retransmission when the link is reestablished, and (f) monitor the link to determine its statistical characteristics, and repacketize the data, based on the link's statistical characteristics, to enhance the link's efficiency.

30 Claims, 7 Drawing Sheets

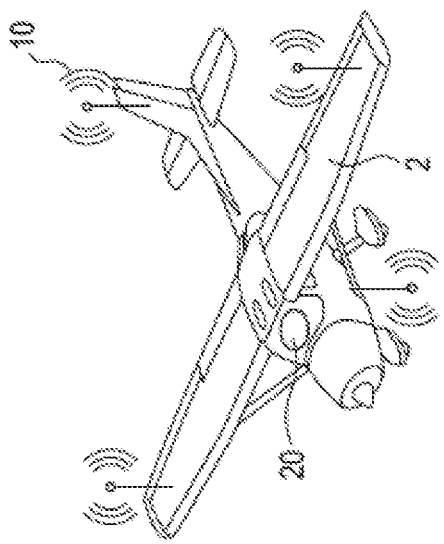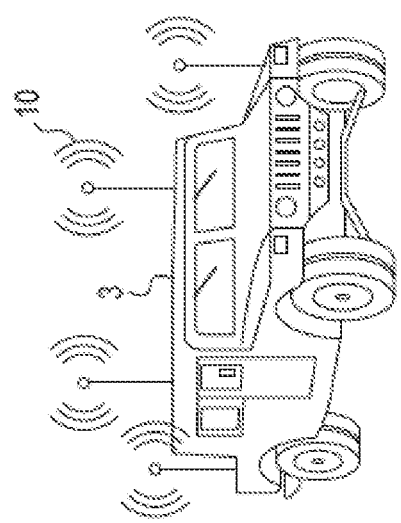
FIG. 3

METHOD FOR ENHANCING THE COMMUNICATIONS EFFICIENCY OF A MOBILE PLATFORM

BACKGROUND OF THE INVENTION

1. Field of the Invention

This invention relates to improved communication methods and devices. It is especially adapted for the radios that are used in mobile platforms (e.g., manned and unmanned, aircraft systems, mobile battlefield units, maritime vessels, satellites).

2. Description of the Related Art

The present inventors have been producing and operating remotely controlled manned and unmanned aircraft systems for decades. Despite the various types of radios being used in these systems, the inventors have consistently noticed that the communications links in their systems are their weakest links.

Such aircraft systems, in various military applications, often operate at the very edge of their communication link's range capability (as far away from the operator as possible), or via satellite communications. Such operating modes present significant challenges, since it is known that communication or RF degradation can occur due to a number of factors that are almost always encountered by aircraft. These include: the relative location of the communicating platforms, the distance from the remote node, and the orientation of the platform and its antenna patterns relative to the remote node.

These communication links may also suffer interference from other sources. These other sources can be the level of the general background noise, inadvertent emitters, interferers due to mismanaged RF spectrum, or purposeful interference emitters, such as "smart" interferers. Such "smart" interferers may not simply degrade the communication link, they may also insert unwanted data into a system's datalink stream. The result of these degradations manifests itself in degraded data quality, reduced effective data rates, and unreliable delivery of a communication's essential data.

Many attempts have been made to improve the effectiveness of the communication links between mobile platforms that utilize a wide range of radios. See, for example, U.S. Pat. Nos. 8,644,281, 8,867,448, 9,961,600, 10,039,114, 10,149,276, 10,454,640, 10,516,454, 10,771,953, 11,057,079, and 2018/0077617.

Despite these attempts, there is still the need for further improvements in the effectiveness of the communication links between mobile platforms. It is the objective of the present invention to provide the methods and devices that will yield such mobile platform communications improvements.

BRIEF DESCRIPTION OF THE DRAWINGS

FIG. 3 illustrates part of a preferred embodiment of the present invention which shows four antennas having been installed on both an aircraft and the ground station or platform with which the aircraft is communicating.

DESCRIPTION OF THE PREFERRED EMBODIMENT

Figure 1:
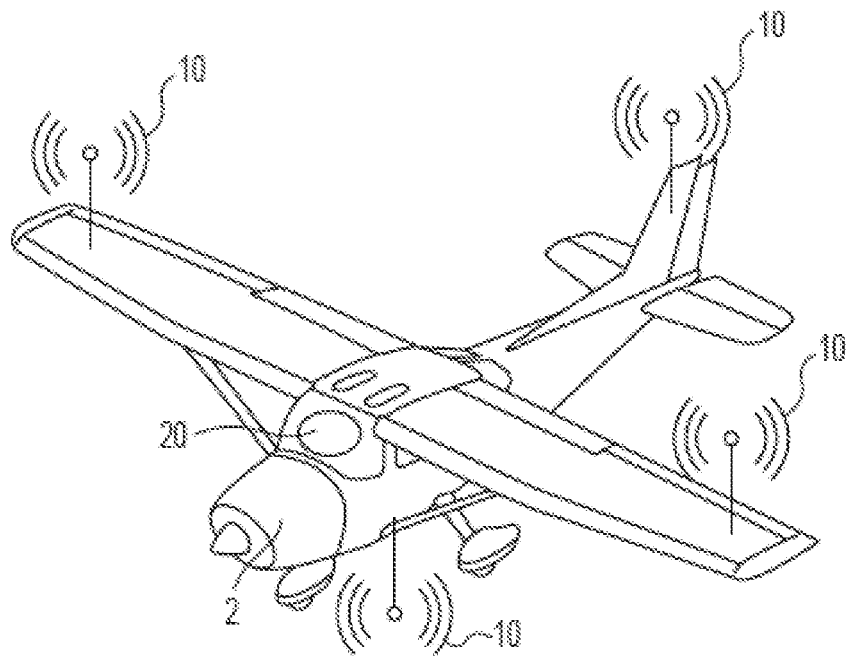
FIG. 1 illustrates part of a preferred embodiment of the present invention which shows four antennas having been installed on an aircraft whose wireless communications are to be improved.

Recognizing the need for improved communication methods and devices that are especially adapted for the wireless networks used in mobile platforms (e.g., manned and unmanned aircraft, mobile battlefield platforms, maritime platforms, satellites) the present invention seeks to provide such improved methods and devices.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Figure 2:
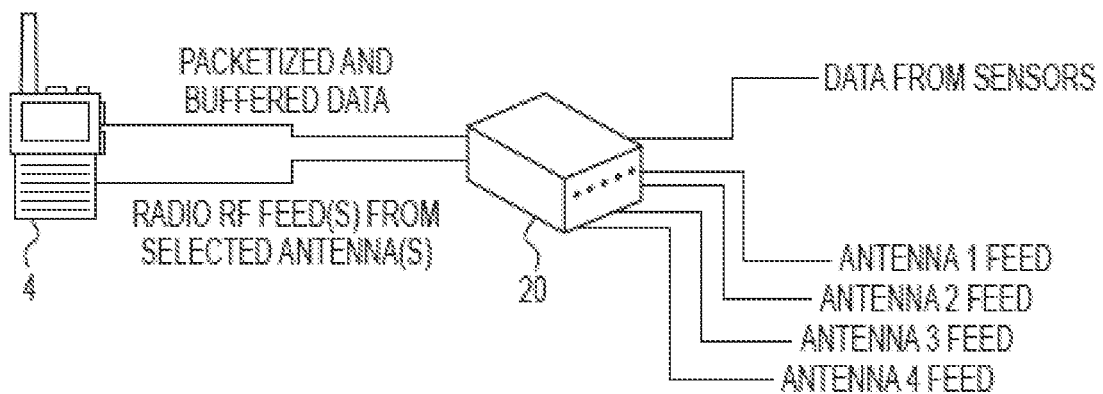
FIG. 2 illustrates the connections that are made between the module or Thunderbolt module and some of the hardware (e.g., antennas, sensors: inertial measurement sensor, IMS, for measuring a platform's motion and orientation), a GNNS receiver for determining a platform's location and navigational information) of the present invention and the aircraft's radio.

FIG. 1 shows the present invention 1 having been installed on an aircraft or platform 2. This installation includes providing the aircraft with antenna diversity, or the use of a plurality of high gain antennas 10 (four are shown), and a control module, or module 20 or "Thunderbolt" module which is connected to the aircraft's radio or software-defined radio (SDR) 4. See FIG. 2.

The module 20 of the present invention can be applied to any type of airborne platform or ground platform 6 or station, including: manned fixed and rotary wing aircraft, unmanned aerial systems (UAS), stratospheric lighter than air (LTA) platforms and aerostats, etc. These installations allow up to four (or more) antennas to be used by the platform's radio regardless of the quantity of antenna inputs on the radio.

This module selects, from these antennas, the antenna(s) to connect to the radio based on a control loop algorithm in the software 70 of the present invention. This software is configured to evaluate the radio's signal strength and/or the platform's navigational data on a continuous basis, and to provide the optimal RF link between the aircraft 2 or platform and the receiving entity 3, airborne or ground.

Figure 4:
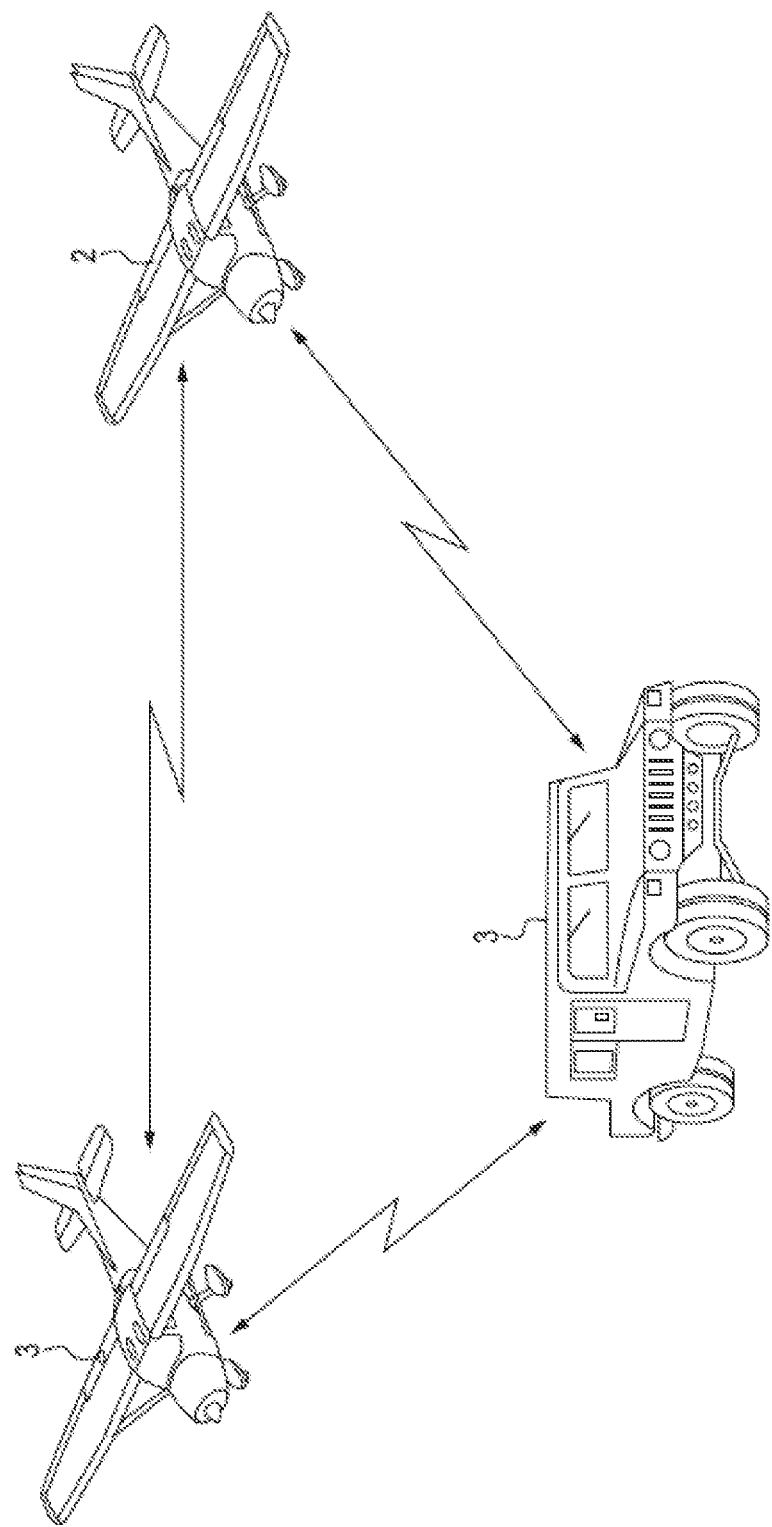
FIG. 4 illustrates part of a preferred embodiment of the present invention which shows four antennas having been installed on two or multiple aircraft that are in communication with each other and with a ground station.

FIG. 3 illustrates part of a preferred embodiment of the present invention which shows four antennas having been installed on both an aircraft 2 and the ground station (or platform) 3 with which the aircraft's radio 4 is communicating. FIG. 4 shows a similar installation that involves four antennas having been installed on two or multiple aircraft that are in communication with each other and with a ground station.

Figure 5:
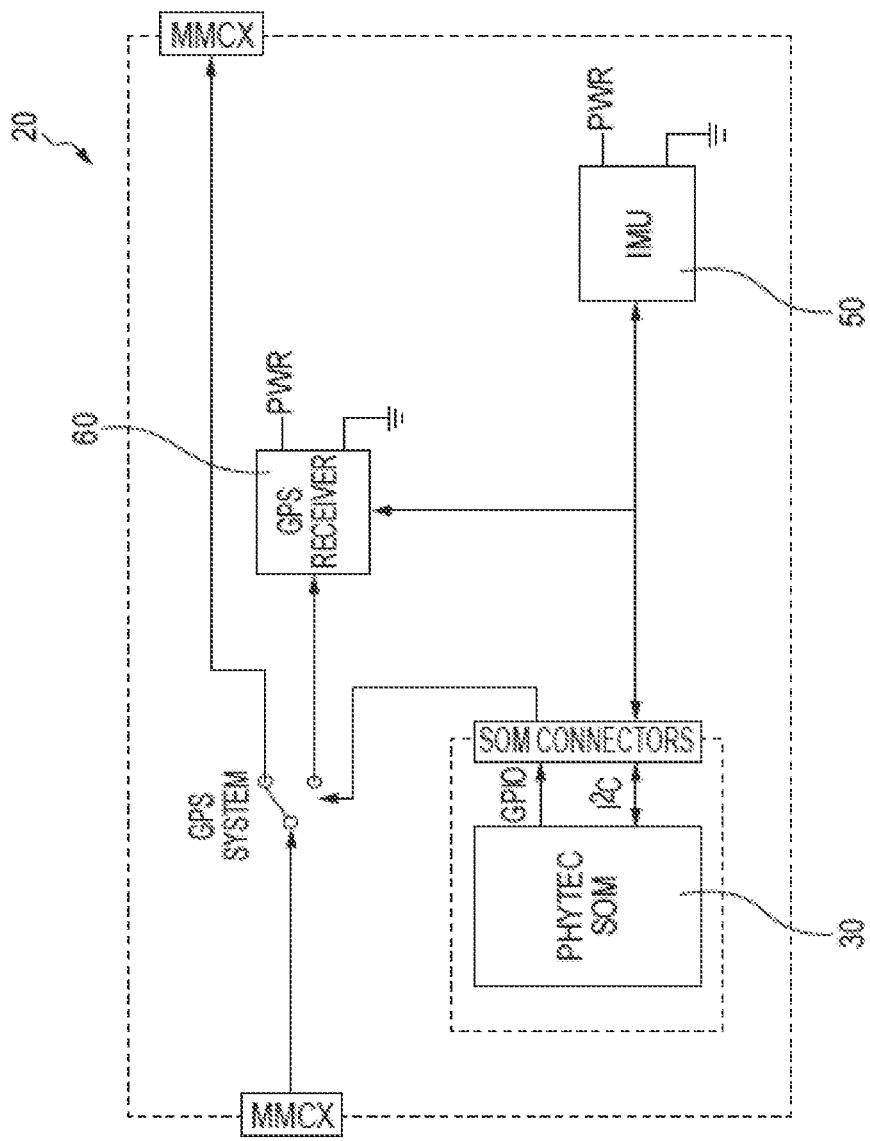
FIG. 5 illustrates the module of the present invention with its processor, inertia sensor, and Global Navigation Satellite System (GNSS) receiver.

The module 20 of the present invention includes a processor 30, an antenna switching mechanism 40, an inertia sensor 50 or inertia measurement unit (IMU), and a Global Navigation Satellite System (GNSS) receiver 60 or sensor. See FIG. 5. This module is installed in each platform or node of the communications network that is to be improved.

The present invention's software is generally configured to assist in performing the task of processing and transmitting a communication between the platforms in a system. This includes the software being configured to perform the steps of: (a) executing a control loop algorithm that constantly evaluates, in real time, the received signal strength of each of a platform's antennas and the navigational and orientation information of each of the platforms to which the antennas are attached, and performs active antenna selection to effectively optimize the performance of a platform's antennas, (b) creating and classifying data packets for transmission based on the nature and criticality of the data contained in the communication, (c) queuing or prioritizing the data based on its classification, with the higher priority data being transmitted first, (d) when a communication link loss occurs, and depending on a packet's classification, automatic retransmitting of critical packets when the communication link is reestablished, a function achieved by utilizing what is referred to herein as Guaranteed Link Protocol (GLP); for non-critical packets, they are store and re-transmitted in the background (so as to not interrupt the transmission of vital real-time data) when link quality and bandwidth improve, a function achieved by utilizing what is referred to herein as preservation buffers (PB), (e) monitoring the communications link to determine its statistical characteristics, and (f) repacketing the data to enhance its link efficiency based on the link's statistical characteristics. All of these steps are discussed in detail below.

Processor hardware elements or components that have proven satisfactory for use in this module include a Texas Instruments AM5728 microcontroller-based System-On-Module (SOM) that contains the following major features (not all are listed): dual ARM Cortex processor running at 1.5 GHz, dual C66x DSP, general purpose memory controller (GPMC) 8/16-bit async memory interface, 4 GB of DDR3 memory, multiple serial and standard interfaces, and dual gigabit ethernet interfaces.

The module's additional hardware components and their capabilities include: an RF "smart diversity" antenna switching unit or mechanism 40 for up to four (or more) independent, high gain antennas, RF level interfacing with any single, dual, or triple antenna radio, independent GPS receiver with bypass capability, independent 9-axis inertial measurement unit (IMU) 50 with accelerometer, gyroscope, and geomagnetic capabilities, serial debug port, dual physical layer ethernet interfaces, 9 to 30 VDC input with independent 5 VDC and 3.3 VDC internal switching power supplies, and an independent, multi-band, real time, kinematic (RTK) GNSS receiver 60 or sensor.

This GNSS receiver provides the module with position data for calculating node geometries in link optimization, and has the following features: compatible with L1/L2 GPS, GLONASS, Galileo, BeiDou constellations, Quasi-Zenith Satellite System (QZSS), Satellite Based Augmentation System (SBAS), differential GNSS (DGNSS), supports networked transport of RTCM via Internet Protocol (NTRIP), supported protocols include UBX, NMEA 4.11, 4.10, 4.0, 2.3, and 2.1, and provides centimeter accuracy.

The internal IMU 50 of the present invention provides platform altitude or orientation data to the processor for calculating, along with the GNSS receiver data, node geometries in link optimization. It yields the following performance: Accelerometer, up to ±16 g, Gyroscope, up to 2000°/s, Geomagnetic, up to ±2500 µT (microtesla).

Figure 6:
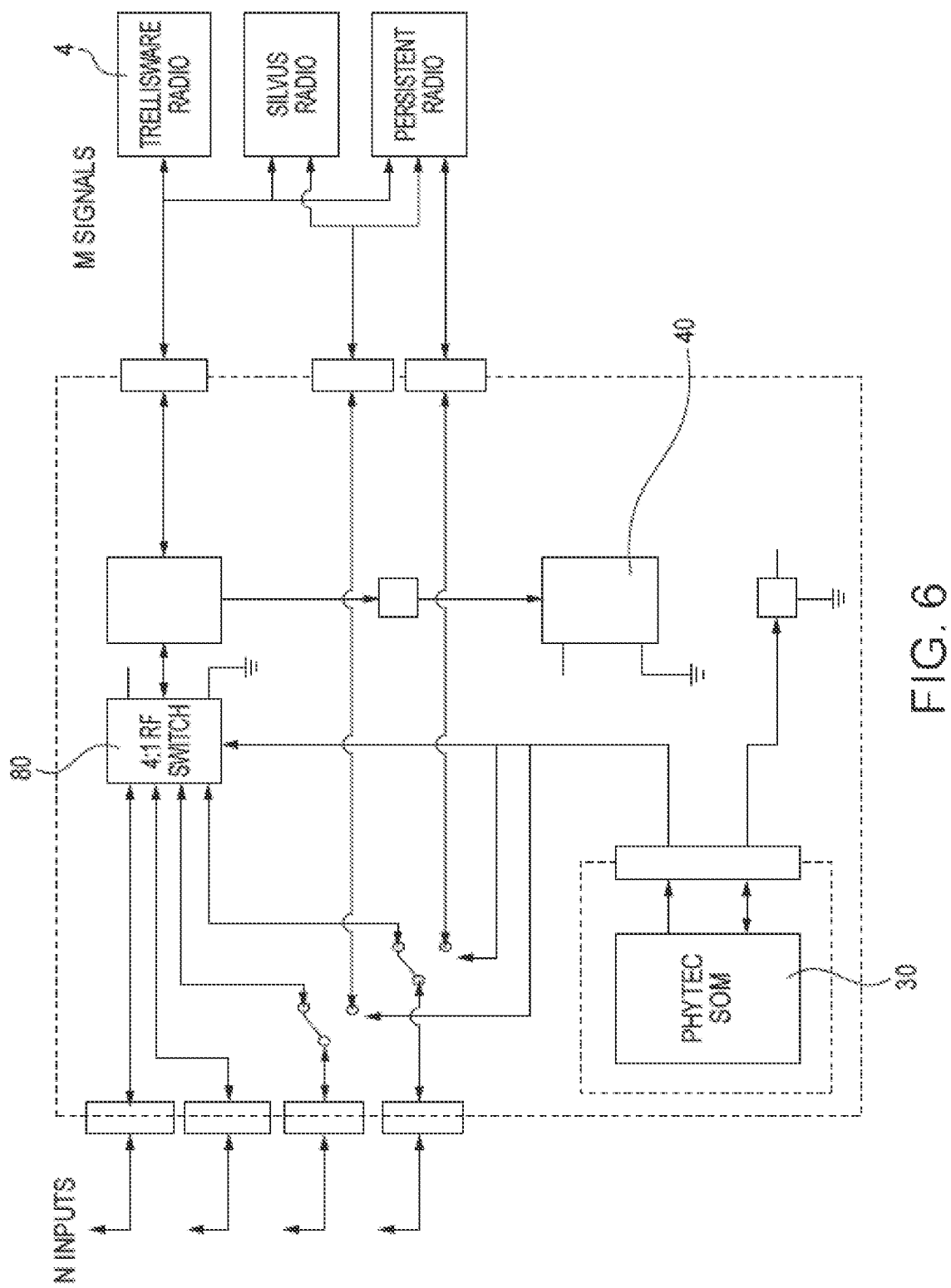
FIG. 6 illustrates an example of the RF path routing between the attached radio and the antenna array, including the single RF connection of a TrellisWare radio to one of four different antennas based on which of those antennas provides the best link performance.

The module's RF "smart diversity" switching unit 40 can ultimately support any N-to-M antenna configuration where 'N' represents the number of antenna RF connections and 'M' represents the number of RF connections to the radio. FIG. 6 shows the RF path routing between the attached radio and the antenna array. For example, the single RF connection of a TrellisWare radio (a SDR) is switched to one of four different antennas based on which of those antennas provides the best link performance.

Antenna switching is performed during the guard time following the end of transmission from the attached radio. Once the transmit power level is detected as being inactive, the processor switches to the antenna with the best overall performance based on signal strength, node geometry, and data performance.

Also shown in FIG. 6 is RF connectivity for other radios 4, with different numbers of antenna inputs, such as Silvus (2 input) or Persistent (3 input), both of which are SDRs. In general, the present invention is designed to allow for N antenna inputs, and, by the use of a crossbar switch 80, to parse these so that the number of antenna signals, e.g., M, being fed to the platform's radio matches the number of antenna inputs that are available on that radio. In regard to the utilized radios, it should be noted that the present invention has been developed to work with a wide variety of commercial and military radios, including Mesh, MIMO Mesh, Mesh WiFi, Wideband secure line of sight, Narrowband line of sight, Analog video broadcast, Point to point Microwave, Wideband satcom, Narrowband satcom, Military tactical, Cellular, Cloud, IOT, Copper, and Fiber. Thus, for interoperability purposes, the present invention can be said to be independent of the type of radio that is used with it. Additionally, the present invention can be said to be radio agnostic, in that the present invention can bridge between various radio network types in real time and with no data loss.

Implementation of the module of the present invention includes the use of a custom circuit board (or boards) that enable all RF conditioning, switching and computer processing. These boards include integrated components for RF switching, processing, ethernet communications, GPS communications, amplification, and power management.

Figure 7:
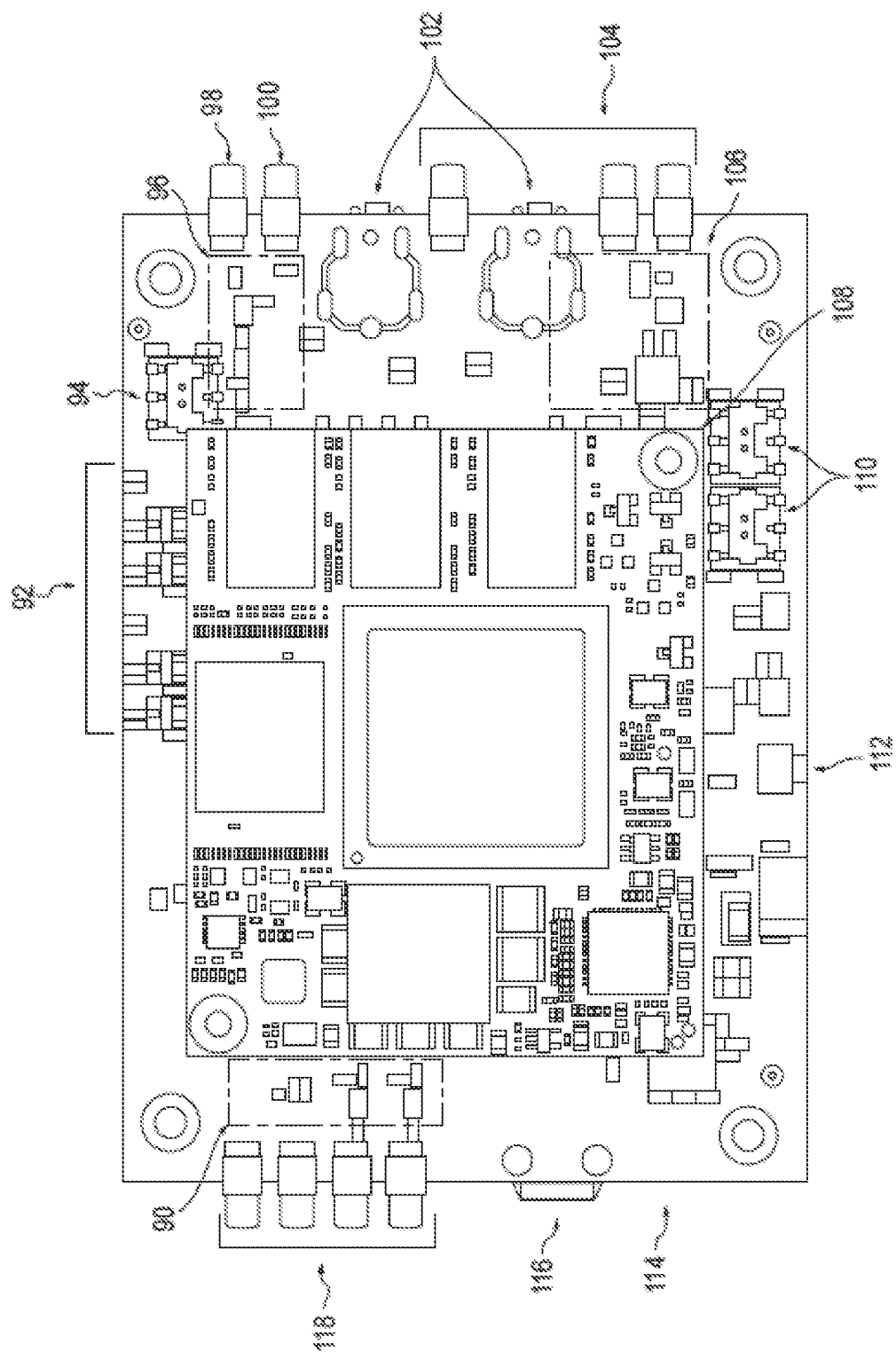
FIG. 7 is a screen shot of a preferred embodiment of a circuit board of the present invention that enables RF conditioning, antennas switching and computer processing of a platform's communications.

FIG. 7 is a screen shot of a preferred embodiment of such a circuit board. It has a size of 2.5 inches wide and 3.5 inches long. This size was chosen primarily to allow for its installation on small, unmanned airborne platforms, but would also be appropriate for other applications where physical size is not necessarily a limitation. Elements included on the board include: antenna switching circuitry 90, status indicators 92, GPS port control switch 94, GPS routing and bias circuitry 96, GPA out 98, GPS in 100, ethernet connections 102, radio connections 104, RF detection and switching 106, the previously mentioned System-On-Module 108, RF port control switches 110, system reset 112, serial port connector 114, power connector 116 and antenna connections 118.

As previously mentioned, the software of the present invention is configured to assist in, among other things, performing the invention's tasks of implementing antenna switching between a plurality of antennas. As a result of this switching, the present invention yields what is herein referred to as an optimized "pseudo isotropic" shape to the energy radiation pattern for its combination of antennas.

Figure 8:
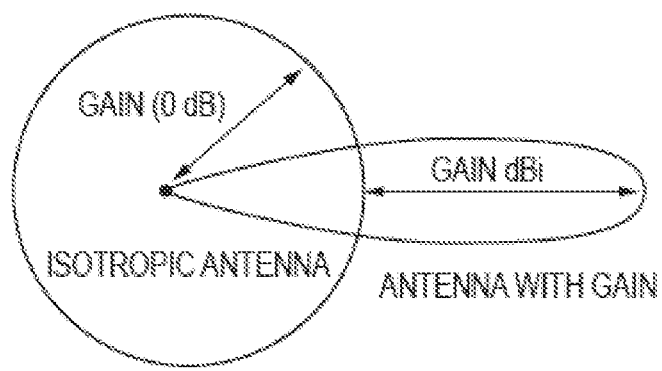
FIG. 8 illustrates the energy radiation pattern differences between isotropic and high gain antennas.
Figure 9:
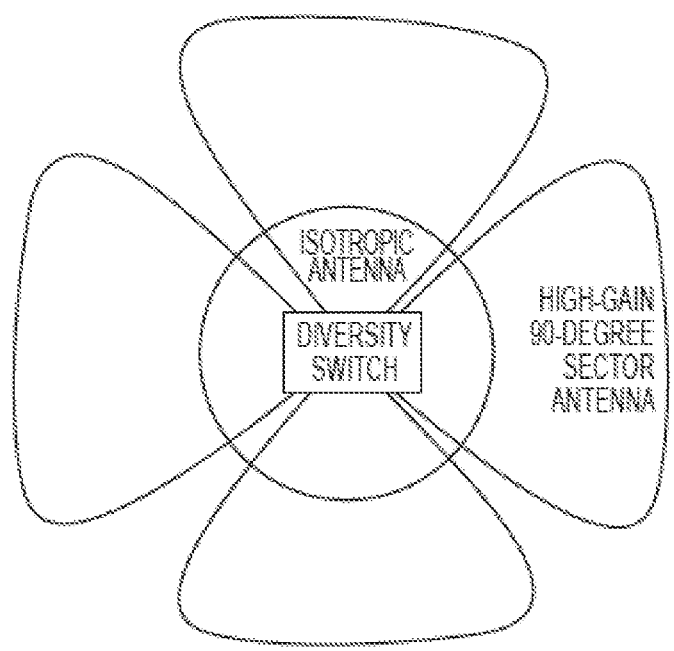
FIG. 9 is an illustration of the "pseudo isotropic" energy radiation pattern that is achieved by the present invention.

To understand the antenna problem presented to the present invention, consider the case of a platform which is a small drone capable of radical changes in attitude and orientation (roll, pitch and yaw). An isotropic antenna, which radiates power uniformly in all directions, would be an excellent solution for maintaining radio link from all aspects of such a drone. However, the downside of an isotropic antenna is that most of an isotropic antenna's energy is radiated away from the intended communication direction, thus reducing range performance. Extended range is achieved by using antennas with gain (or directivity) that focuses energy into a beam with direction. The downside of an antenna with gain is that as the platform maneuvers the beam may steer away from the intended communication direction. See FIG. 8 which illustrates the energy radiation pattern differences between isotropic and high gain antennas. Shown in FIG. 9 is the "pseudo isotropic" energy radiation pattern that is achieved by the present invention.

The present invention is different from standard antenna combiners in that it minimizes loss in its diversity switch. A typical antenna circuit that combines inputs from multiple antennas will suffer from insertion loss (i.e., the loss of signal power resulting from the insertion of a device into the link) and from interference with the other antennas that are not intended to be in use at the time. By the present invention's utilization of a low-loss, diversity selector switch (instead of combiners 0 insertion loss is minimized (i.e., it selects a specific antenna and blanks the others, yielding more efficiency in terms of the antenna switching's power and quality).

It is also different from radio beamforming implementations because it does not base its algorithms on the assumption that antennas will be spaced or oriented in a known way. The present invention is intended to support customization to the installed platform. Each platform (drone, manned fixed wing, rotary wing, ground vehicle, etc.) offers unique opportunities and challenges for placement and orientation of its different antennas. Its module enables proactive selection of antennas based on installed performance rather than out-of-the-box radio algorithms; this can be seen as "preconditioning" inputs to the radios, enabling them to perform optimally in all directions.

The present invention creates an optimum RF input to a platform's radios without interfering with the timing of the protocols of the radios. This is accomplished by a module's electronics monitoring the transmit output of the radio and performing antenna circuit switching only when the radio is not in a transmit mode. The software of the present invention takes advantage of the "dead time" between the end of the transmit period and the beginning of the receive period to change the antennas' configuration so that no data is lost. In the rare event that any data loss does occur, such small losses are recovered by the use of the GLPs of the present invention.

The operation of the plurality of antennas per platform of the present invention actually involves two forms of diversity: adaptive and predictive. Its adaptive form or approach uses radio-provided parameters to measure a system's link performance in near real-time and to make changes when those parameters meet certain thresholds. Its predictive form or approach leverages navigation data reported by the two nodes, and a knowledge of the local antenna gain patterns of a node.

Through the research of the present inventors, it was found that (by measuring the content of the over-the-air transmitted data streams) there are often large amounts of empty data packets being transmitted, thus reducing the effective throughput of the datalink. This is caused by sending data to the radio in an inefficient way. The software of the present invention is configured to manage the radio's input by preconditioning the data input to it so that enhanced or optimum use of airtime is achieved.

The present invention's process of radio management also includes actions to address those situations when it is known that link degradations will occur (e.g., in contested or edge conditions, or if an intermittent jammer is encountered). To address these situations, it was found necessary to real time monitor a platform's radio communications link to measure its statistical characteristics. A balancing algorithm is then used to repacket the data into sizes that are dependent on the link's measured statistical characteristics and chosen so as to enhance or optimize the link's performance.

Even with the enhancements provided with the "smart diversity" antenna switching unit of the present invention and its process of radio management, communication links can often cycle through degraded and temporary lost-link conditions (e.g., when drones operate at the edge of the datalink maximum range). Consequently, portions of the software of the present invention are used to further implement a data management process to improve the consistency of the communication linkage between platforms (e.g., addressing those situations when insufficient link quality or bandwidth does not support real-time transfer of communication data). This involves the use of what is herein called data classification, a GLP algorithm, data prioritization, buffering, and enhanced or optimized network utilization based on the bandwidth availability of a platform's radio.

The software of the present invention uses data classification to determine which data is or is not required to be guaranteed for assured delivery. For example, a video stream does not need to be guaranteed that every bit of it is delivered perfectly. If a bit is flipped in a video stream, it is not consequential to the overall quality of the system. Other data, such as command and control, metadata and signals intelligence, require that every bit is intact.

The present invention's task of classifying data involves evaluating each incoming packet against a set of rules (defined by the radio user). It then applies a classification to each communication packet that coincides with which rules matched the characteristics of the packet. Additionally, the data classification portion of the present invention has been developed with user-definable architectures so that the invention's GLP process can be easily integrated into new applications (e.g., system-of-systems, distributed operations, and $3^{rd}$ party platforms, payloads and radios).

The development of the present invention's GLP algorithm or process began in 2007 when one of the inventors, Bob Wise, wrote his first technical paper on this topic. It was noted therein that unmanned aircraft system (UAS) platforms, operated via a multitude of communication datalinks, including satellite communications (SATCOM), suffered from inconsistent link performance.

Because different communication applications use different radios, the GLP algorithm and process of the present invention operates at the data level, replacing standard protocols such as transmission control protocol/internet protocol (TCP/IP). The GLP process of the present invention proactively manages data that is classified as "assured," packages this data, monitors its delivery, maintains statistics on link quality and data buffers, and performs acknowledgement/negative acknowledgement (ack/nack) type feedback and retries to achieve guaranteed data delivery.

To provide further advances in the effectiveness of its GLP algorithms, the present invention developed what is herein referred to as "data prioritization" to add to its capability to define priority schemes to guaranteed data streams. For example, aircraft steering guaranteed data is more urgent than camera steering data. With data prioritization, higher priority data gets transmitted first, followed by lower priority data. Proper prioritization of data leads to better quality of service, link stability and reliability, and reduced network loading.

To further enhance the communications capabilities of the present invention, what is referred to herein as a scheme of "preservation buffering" was developed. The need for this capability can be illustrated by the situation that occurs when a user wants to operate an unmanned aircraft system (UAS) when they know it will fly beyond the maximum range of its communication datalink. For example, a user may want a drone to fly far out of range and perform pre-defined operations, collecting data along the way.

In this scenario, the present invention's software-implemented, preservation buffering scheme provides the capability to capture and store information on a remote platform (to be downloaded upon demand once the platform returns within the network's range). Preservation buffers provide a method of storing data locally when insufficient link quality or bandwidth does not support real-time transfer. Data stored can be selected by source and type, similar to that described above for data classification.

Stored data can be automatically transmitted in the background when link quality and bandwidth improve, without interrupting the transmission of vital real-time data. Thus, preservation buffers support operating in challenging environments or over-the-horizon scenarios. Data can also be stored locally for post-flight evaluation when full transmission is not possible.

To enhance the communications capabilities of the present invention, what is referred to herein as a scheme or method of "optimized or enhanced network utilization based on the bandwidth availability of a platform's radio" was developed. Thus, the present invention includes the ability to dynamically adapt packet content based on link conditions.

The present invention still further improves the efficiency of remote operations by changing the behavior of the transmitting platform based on available network bandwidth. For one example, if a drone is downlinking 720P HD video under perfect conditions, as the link degrades with range the video stream will degrade. Rather than simply allowing the radio to manage a large input data stream, the software of the present invention enables proactive selection of a lower data stream by decreasing image size, resolution, or temporal frame rate. The result is that this method provides the operator with deterministic operational performance.

Yet another communication-enhancing capability of the present invention is its use of "automated streaming sensor data error detection and correction" techniques. The microprocessor of the present invention is capable of supporting additional, third-party algorithms (including those using polynomial-based, forward error correction for sensor video data and artificial intelligence/machine learning) to provide sensor data error detection and correction while not overburdening the network.

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted which fall within the scope of the invention that is hereinafter set forth in the claims to the invention.

We claim:

1. A method for increasing the effective range and data rates of data packets over the communications link between the radios of mobile platforms, said method comprising the steps of:
    attaching to said radio of each of said platforms:
        a plurality of high gain antennas,
        a processor that has a memory and a plurality of interfaces that are configured to enable connection to each of said plurality of antennas,
        an antenna switching mechanism that is configured to enable switching of said radio between each of said plurality of antennas,
        an inertial measurement unit that is configured to assist in determining the orientation information of said platform to which said unit is attached,
        a GNSS receiver that is configured to assist in determining the navigational information of said platform to which said receiver is attached, providing each of said processors with software that is configured to:
        execute a control loop algorithm that constantly evaluates the received signal strength of each of said plurality of antennas and said orientation and navigational information of each of said platforms in real-time,
        perform said antenna switching based upon said received signal strength and said orientation and navigational information for said platforms,
        determine critical packets of the data packets that are required to be guaranteed for assured delivery,
        classify and prioritize the critical packets of the data packets for transmission,
        queue said critical data packets, that are required to be guaranteed for assured delivery based on said data classification, during a communication link loss for retransmission when said communication link is reestablished,
        monitor said communications link to determine the statistical characteristics of said link,
        retransmit, based on said link statistical characteristics, the critical packets when the communication link is reestablished utilizing a Guaranteed Link Protocol (GLP), and
        include the steps of, for said determined critical data packets that are required to be guaranteed for assured delivery, monitoring delivery, maintaining statistics on link quality and data buffers, and performing acknowledgement/negative acknowledgement type feedback on the delivery of said critical packets portion and, when necessary, retrying the sending of said critical packets until delivery is acknowledged.

2. The method as recited in claim 1, wherein:
    said software is further configured to precondition said data to each of said radios so that enhanced use of the airtime of said radios is achieved.

3. The method as recited in claim 1, wherein:
said software is further configured so that said step of queuing data utilizes a preservation buffering scheme.

4. The method as recited in claim 2, wherein:
said software is further configured so that said step of queuing data utilizes a preservation buffering scheme.

5. The method as recited in claim 1, wherein:
said software is further configured to employ enhanced network utilization based on the bandwidth availability of said radios of a platform.

6. The method as recited in claim 3, wherein:
said software is further configured to employ enhanced network utilization based on the bandwidth availability of said radios of a platform.

7. The method as recited in claim 3, wherein:
said software is further configured to employ enhanced network utilization based on the bandwidth availability of said radios of a platform.

8. The method as recited in claim 4, wherein:
said software is further configured to employ enhanced network utilization based on the bandwidth availability of said radios of a platform.

9. The method as recited in claim 1, wherein:
said software is further configured to assist in performing said antenna switching to yield for said plurality of antennas a "pseudo isotropic," energy radiation pattern.

10. The method as recited in claim 2, wherein:
said software is further configured to assist in performing said antenna switching to yield for said plurality of antennas a "pseudo isotropic," energy radiation pattern.

11. The method as recited in claim 3, wherein:
said software is further configured to assist in performing said antenna switching to yield for said plurality of antennas a "pseudo isotropic," energy radiation pattern.

12. The method as recited in claim 5, wherein:
said software is further configured to assist in performing said antenna switching to yield for said plurality of antennas a "pseudo isotropic," energy radiation pattern.

13. The method as recited in claim 1, wherein:
said processor is further configured to support third-party software.

14. The method as recited in claim 2, wherein:
said processor is further configured to support third-party software.

15. The method as recited in claim 3, wherein:
said processor is further configured to support third-party software.

16. The method as recited in claim 5, wherein:
said processor is further configured to support third-party software.

17. The method as recited in claim 9, wherein:
said processor is further configured to support third-party software.

18. The method as recited in claim 1, wherein:
said software is further configured to monitor the transit output of said radios and ensure that no antenna switching occurs when said radios are transmitting.

19. The method as recited in claim 2, wherein:
said software is further configured to monitor the transit output of said radios and ensure that no antenna switching occurs when said radios are transmitting.

20. The method as recited in claim 3, wherein:
said software is further configured to monitor the transit output of said radios and ensure that no antenna switching occurs when said radios are transmitting.

21. The method as recited in claim 5, wherein:
said software is further configured to monitor the transit output of said radios and ensure that no antenna switching occurs when said radios are transmitting.

22. The method as recited in claim 9, wherein:
said software is further configured to monitor the transit output of said radios and ensure that no antenna switching occurs when said radios are transmitting.

23. The method as recited in claim 13, wherein:
said software is further configured to monitor the transit output of said radios and ensure that no antenna switching occurs when said radios are transmitting.

24. A device for increasing the effective range and data rates of data packets over the communications link between the radios of an aerial platform and another aerial platform or ground platform, said device comprising:
a plurality of high gain antennas being attached to said radios of each of said platforms,
a plurality of processors, one of which is attached to said radios of each of said platforms, each of which has a memory and a plurality of interfaces, and configured to enable connection to each of said plurality of antennas that are connected to said platform to which said processor is attached,
a plurality of antenna switching mechanisms, one of which is attached to said radio of each of said platforms, each of which is configured to enable switching of said radio between each of said plurality of antennas that are connected to said platform to which said switching mechanism is attached,
a plurality of inertial measurement units that are each configured to assist in determining the orientation information of said platform to which said unit is attached, and with one of said units being attached to said radio of each of said platforms,
a plurality of GNSS receivers that are each configured to assist in determining the navigational information of said platform to which said receiver is attached, and with one of said receivers being attached to said radios of each of said platforms,
a plurality of pieces of software, one of which resides on each of said processors, each of which is configured to, for the platform to which said processor is attached:
execute a control loop algorithm that constantly evaluates the received signal strength of each of said plurality of antennas and said orientation and navigational information of said platform in real-time,
perform said antenna switching based upon said received signal strength and orientation and navigational information for said platforms,
determine critical packets of the data packets that are required to be guaranteed for assured delivery,
classify and prioritize the critical packets of the data packets for transmission,
queue said critical data packets, that are required to be guaranteed for assured delivery based on said data classification, during a communication link loss for retransmission when said communication link is reestablished,
monitor said communications link to determine the statistical characteristics of said link,
retransmit, based on said link statistical characteristics, the critical packets when the communication link is reestablished utilizing a Guaranteed Link Protocol (GLP), and
include the steps of, for said determined critical data packets that are required to be guaranteed for assured delivery, monitoring delivery, maintaining statistics on link quality and data buffers, and performing acknowledgement/negative acknowledgement type feedback on the delivery of said critical packets and, when necessary, retrying the sending of said critical packets until delivery is acknowledged.

25. The device as recited in claim 24, wherein said software is further configured to precondition said data to each of said radios so that enhanced use of the airtime of said radios is achieved.

26. The device as recited in claim 24, wherein said software is further configured so that said step of queuing data utilizes a preservation buffering scheme.

27. The device as recited in claim 25, wherein said software is further configured so that said step of queuing data utilizes a preservation buffering scheme.

28. The device as recited in claim 24, wherein said software is further configured to employ enhanced network utilization based on the bandwidth availability of said radios of a platform.

29. The device as recited in claim 25, wherein said software is further configured to employ enhanced network utilization based on the bandwidth availability of said radios of a platform.

30. The device as recited in claim 26, wherein said software is further configured to employ enhanced network utilization based on the bandwidth availability of said radios of a platform.

* * * * *